United States Patent
Hu et al.

(10) Patent No.: US 10,652,270 B1
(45) Date of Patent: May 12, 2020

(54) BOTMASTER DISCOVERY SYSTEM AND METHOD

(71) Applicants: NTT Innovation Institute, Inc., East Palo Alto, CA (US); Nippon Telegraph and Telephone Corporation, Tokyo (JP)

(72) Inventors: Bo Hu, East Palo Alto, CA (US); Kenji Takahashi, East Palo Alto, CA (US); Masayuki Inoue, East Palo Alto, CA (US)

(73) Assignee: NTT Research, Inc., Palo Alto, CA (US)

( * ) Notice: Subject to any disclaimer, the term of this patent is extended or adjusted under 35 U.S.C. 154(b) by 326 days.

(21) Appl. No.: 15/191,330

(22) Filed: Jun. 23, 2016

(51) Int. Cl.
 *H04L 29/06* (2006.01)
(52) U.S. Cl.
 CPC ...... *H04L 63/1441* (2013.01); *H04L 63/1425* (2013.01); *H04L 2463/144* (2013.01)
(58) Field of Classification Search
 CPC ............. H04L 63/1441; H04L 63/1425; H04L 2463/144
 USPC .......................................................... 726/23
 See application file for complete search history.

(56) References Cited

U.S. PATENT DOCUMENTS

| | | | |
|---|---|---|---|
| 7,912,698 B2 | 3/2011 | Statnikov et al. | |
| 8,135,718 B1 | 3/2012 | Das et al. | |
| 8,418,249 B1 * | 4/2013 | Nucci .................. | G06F 21/552 706/20 |

(Continued)

OTHER PUBLICATIONS

Auto—WEKA webpage printed regarding algorithms (2 pages) (Chris Thornton et al.) Feb. 17, 2015.

(Continued)

*Primary Examiner* — Harunur Rashid
*Assistant Examiner* — Sakinah White Taylor
(74) *Attorney, Agent, or Firm* — DLA Piper LLP (US)

(57) ABSTRACT

A system and method for botmaster discovery are disclosed. The system and method may be used in a network that has a plurality of known malicious domains, a plurality of servers each having a known malicious internet protocol (IP) address in which each server is associated with one or more of the plurality of domains, a plurality of hosts associated with one or more of the plurality of servers wherein the host is one of a bot which is compromised host and involved as a part of resource for cyber-crime purpose and a botmaster which involves bots for cyber-crime purpose. The system and method generate a plurality of clusters of known malicious entities, the known malicious entities being one or more known malicious IP addresses, one or more known malicious domains and a known malicious domain and a known malicious IP address, perform flow matching of each IP address in each cluster of known malicious entities between a plurality of source IP addresses and a plurality of destination IP addresses to identify a plurality of host flows wherein each host flow has a source IP address or a destination IP address matched a particular IP address in a cluster of known malicious entities and detect a bot master of each cluster of known malicious entities from the plurality of host flows corresponding to each cluster of known malicious entities by analyzing difference of flow features between the bot and the botmaster.

8 Claims, 9 Drawing Sheets

(56) References Cited

U.S. PATENT DOCUMENTS

| | | | |
|---|---|---|---|
| 8,726,379 B1* | 5/2014 | Stiansen | H04L 63/1491 726/22 |
| 8,762,298 B1* | 6/2014 | Ranjan | G06N 5/02 706/12 |
| 2002/0052858 A1 | 5/2002 | Goldman et al. | |
| 2002/0138492 A1 | 9/2002 | Kil | |
| 2004/0128535 A1 | 7/2004 | Cheng | |
| 2006/0037080 A1 | 2/2006 | Maloof | |
| 2007/0261112 A1* | 11/2007 | Todd | G06F 21/577 726/11 |
| 2008/0220740 A1* | 9/2008 | Shatzkamer | H04L 63/101 455/411 |
| 2008/0279387 A1 | 11/2008 | Gassoway | |
| 2008/0294019 A1 | 11/2008 | Tran | |
| 2009/0028141 A1 | 1/2009 | Vu Duong et al. | |
| 2009/0254992 A1 | 10/2009 | Schultz et al. | |
| 2010/0007489 A1 | 1/2010 | Misra et al. | |
| 2010/0183211 A1 | 7/2010 | Meetz et al. | |
| 2010/0201489 A1 | 8/2010 | Griffin | |
| 2011/0299420 A1 | 12/2011 | Waggener et al. | |
| 2013/0111036 A1 | 5/2013 | Ozawa et al. | |
| 2014/0122370 A1 | 5/2014 | Jamal et al. | |
| 2014/0136846 A1 | 5/2014 | Kitze | |
| 2014/0157405 A1* | 6/2014 | Joll | H04L 63/1425 726/22 |
| 2014/0201374 A1 | 7/2014 | Ashwood-Smith | |
| 2014/0219096 A1 | 8/2014 | Rabie et al. | |
| 2014/0259170 A1 | 9/2014 | Amsler | |
| 2014/0317261 A1 | 10/2014 | Shatzkamer et al. | |
| 2014/0317293 A1 | 10/2014 | Shatzkamer | |
| 2015/0082308 A1 | 3/2015 | Kiess et al. | |
| 2015/0227964 A1 | 8/2015 | Yan et al. | |
| 2015/0288767 A1 | 10/2015 | Fargano et al. | |
| 2015/0317169 A1 | 11/2015 | Sinha et al. | |
| 2015/0326535 A1 | 11/2015 | Rao et al. | |
| 2015/0333979 A1 | 11/2015 | Schwengler et al. | |
| 2015/0381423 A1 | 12/2015 | Xiang | |
| 2016/0006642 A1 | 1/2016 | Chang et al. | |
| 2016/0050161 A1 | 2/2016 | Da et al. | |
| 2016/0057234 A1 | 2/2016 | Parikh et al. | |
| 2016/0154960 A1 | 6/2016 | Sharma et al. | |
| 2016/0248805 A1* | 8/2016 | Burns | H04L 63/1433 |
| 2016/0364553 A1 | 12/2016 | Smith | |

OTHER PUBLICATIONS

Ayat, N.E.; Cheriet, M.; Suen, C.Y.; "Automatic Model Selection for the optimization of SVM Kernels," Mar. 21, 2005 (35 pages).

Brodley, Carla E., "Addressing the Selective Superiority Problem: Automatic Algorithm/Model Class Selection," (1993) (8 pages).

Chapelle, Olivier; Vapnik, Vladimir; Bousquet, Olivier; Mukherjee, Sayan; "Choosing Multiple Parameters for Support Vector Machines," *Machine Learning*, 46, 131-159, 2002 © 2002 Kluwer Academic Publishers (29 pages).

Lee, Jen-Hao and Lin, Chih-Jen, "Automatic Model Selection for Support Vector Machines, pp. 1-16" (2000).

Smith, Michael R.; Mitchell, Logan; Giraud-Carrier, Christophe; Martinez, Tony; "Recommending Learning Algorithms and Their Associated Hyperparameters," Jul. 7, 2014 (2 pages).

Thornton, Chris. Thesis: "Auto-WEKA: Combined Selection and Hyperparameter Optimization of Supervised Maching Learning Algorithms," Submitted to the University of British Columbia, Mar. 2014 (75 pages).

Thornton, Chris; Hutter, Frank; Hoos, Holger H.; Leyton-Brown, Kevin. "Auto-WEKA: Combined Selection and Hyperparameter Optimization of Classification Algorithms," Mar. 2013 (9 pages).

Wolinski, Christophe; Kuchcinski, Krzysztof. "Automatic Selection of Application-Specific Reconfigurable Processor Extensions." *Design, Autoination & Test in Europe Conference* (DATE '08), Mar. 2008, Munich, Germany, pp. 1214-1219 (7 pages).

Workshop Handout edited by Joaquin Vanschoren, Pavel Brazdil, Carlos Soares and Lars Kotthoff, "Meta-Learning and Algorithm Selection Workshop at ECAI 2014," MetaSel 2014, Aug. 19, 2014 (66 pages).

H. Larochelle et al. "An empirical evaluation of deep architectures on problems with many factors of variation" ACM ICML '07, p. 473-480 (8 pgs).

J. Bergstra et al. "Random Search for Hyper-Parameter Optimization" Journal of Machine Learning Research 13 (2012), p. 281-305 (25 pgs).

Wikipedia—anonymous—https://en.wikipedia.org/wiki/Decision_tree (5 pgs).

Wikipedia—anonymou—https://en.wikipedia.org/wiki/Support_vector_machine(16 pgs).

Wikipedia—anonymous—https://en.wikipedia.org/wiki/K-nearest_neighbors_algorithm (11 pgs).

Wikipedia—anonymous—https://en.wikipedia.org/wiki/Gradient_boosting (8 pgs).

Wikipedia—anonymous—https://en.wikipedia.org/wiki/Naive_Bayes_classifier (10 pgs).

Wikipedia—anonymous—https://en.wikipedia.org/wiki/Bootstrap_aggregating (3 pgs).

Wikipedia—anonymous—https://en.wikipedia.org/wiki/Logistic_regression (14 pgs).

Wikipedia—anonymous—https://en.wikipedia.org/wiki/AdaBoost (12 pgs).

KAGGLE—https://www.kaggie.com/wiki/Home (2 pgs.).

Wikipedia—anonymous—TLS: Transport Layer Security Protoco— Webpage https://en.wikipedia.org/wiki/Transport_Layer_security (1 pgs/).

NIST—National Insitute of Standards and Techology, US Department of Commerce "Computer Security Resource Center" AES Algorithm With Galois Counter Mode of Operation. Webpage https://csrc.nist.gov/projects/block-cipher-techniques/bcm (3 pgs.).

Moriarty, et al. PKI Certificate—PKCS #12: Personal Information Exchange Syntax v1.1—Webpage https://tools.ietf.org/html/rfc7292 (30 pgs.).

ITU—International Telecommunication Union—Open Systems Interconnection—X.509: Information Technology—Public-key and attribute framework certificate—Webpage http://www.itu.int/rec/T-REC-X.509/enn (2 pgs.).

Groves, M., Sakai-Kasahara Key Encryption (SAKKE)—Internet Engineering Task Force dated Feb. 2012—Webpage https://tools.ietf.org/html/rfc6508 (22 pgs.).

Barbosa, L. et al.—SK-KEM: An Identity-Based Kem, Algorithm standardized in IEEE—Webpage http://grouper.ieee.org/groups/1363/IBC/submissions/Barbosa-SK-KEM-2006-06.pdf (20 pgs.).

Boyen-X, et al—Identity-Based Cryptography Standard (IBCS) #1: Supersingular Curve Implementations of the BF and BB1 Cryptosystems, dated Dec. 2007—Webpage https://tools.ietf.org/html/rfc5091 (64 pgs.).

An Amazon.com company @ Alexa—Webpage: https://www.alexa.com/siteinfo (5 pgs.).

Stouffer, K. et al.—"The National Institute of Standards & Technology(NIST) Industrial Control System (ICS) security guide" dated May 2015 (247 pgs.).

* cited by examiner

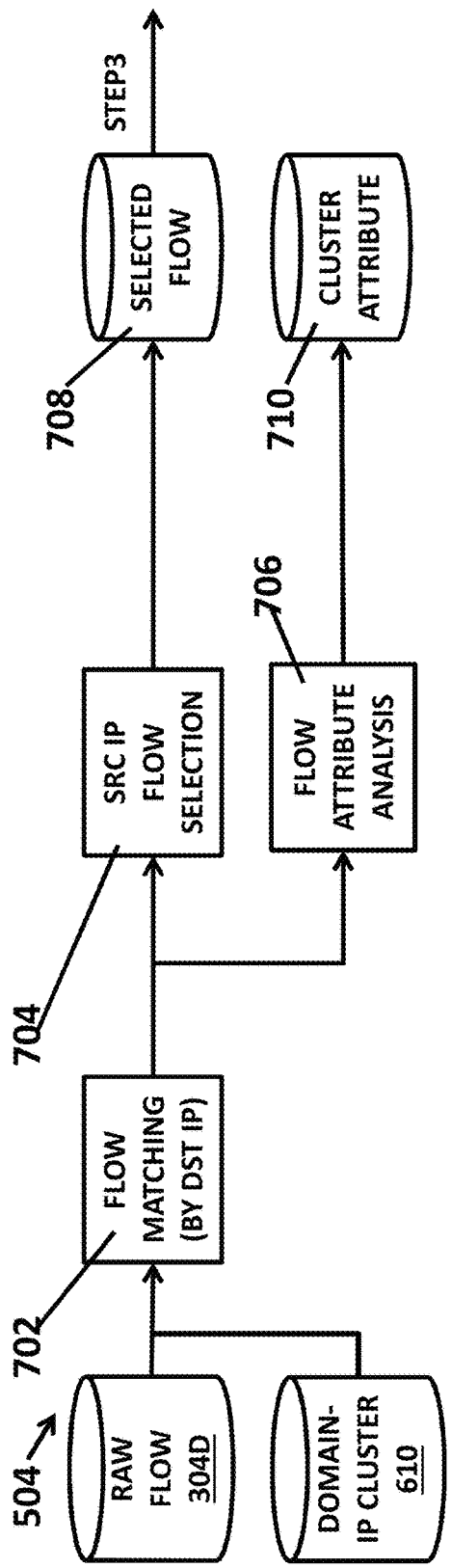
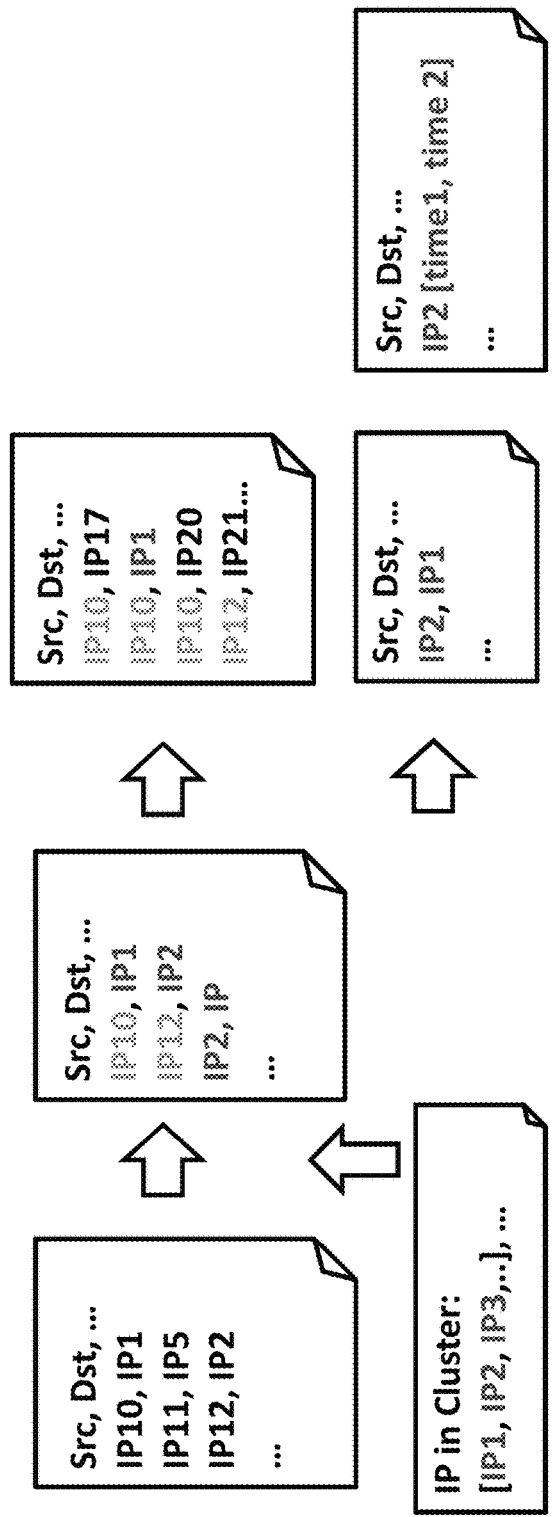
FIGURE 7A
FIGURE 7B

BOTMASTER DISCOVERY SYSTEM AND METHOD

FIELD

The disclosure relates generally to detecting a cyber threat and in particular to discovering a botmaster of a cyber threat.

BACKGROUND

Botnets are known and consist of a plurality of computer systems that are working in a coordinated manner. Botnets can exist for legal purposes, but are often use for nefarious purposes in which each computer resource of the botnet may be infected with malicious code. A botmaster is a computer that is controlling the other plurality of computer system that are part of the botnet. It is desirable to be able to discover the attacked groups of the plurality of computer systems and the botmaster.

BRIEF DESCRIPTION OF THE DRAWINGS

FIGS. 7A and 7B illustrate more details of a flow matching and analysis process that is part of the botmaster discovery process;

DETAILED DESCRIPTION OF ONE OR MORE EMBODIMENTS

The disclosure is particularly applicable to a botmaster discovery system and method as implemented and it is in this context that the disclosure will be described. It will be appreciated, however, that the system and method has greater utility since it can be implemented in other ways that are within the scope of the disclosure.

Figure 1:
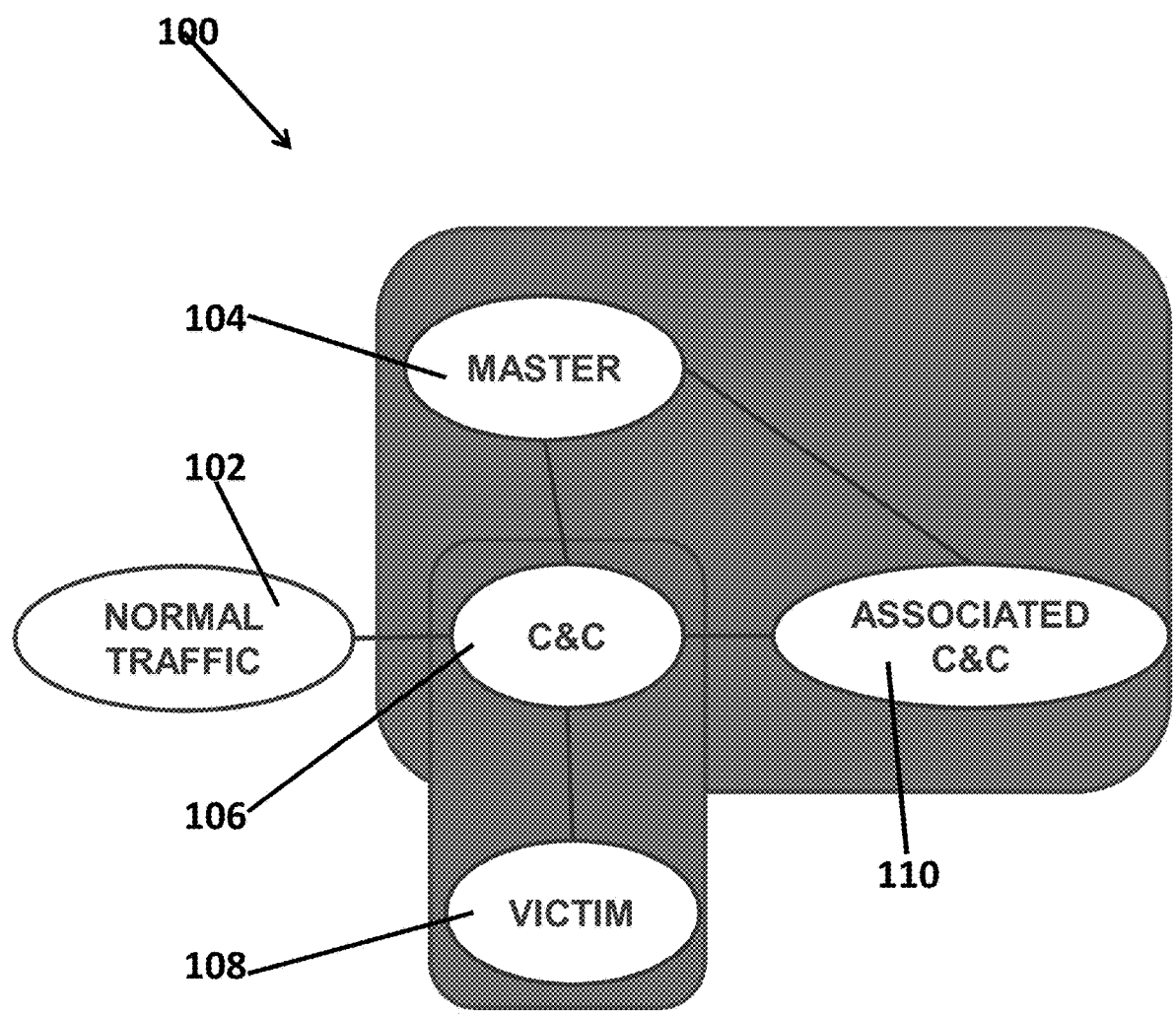
FIG. 1 illustrates an example of a high level attacker group.

FIG. 1 illustrates an example of a high level attacker group 100 that may be discovered by the system and method as described below. The attacker group 100 may receive normal internet protocol (IP) traffic 102 that may be received by one or more command and control (C&C) computers 106 that may control one or more victim computers 108 to carry out the nefarious actions of the attacker group. Each victim computer 108 is a computer system that is being controlled by the attacker group unbeknownst to the user/owner of the computer system. The attacker group may also have one or more associated command and control computer systems 110 that may be coupled to the one or more C&C 106. The one or more C&C 106 and the one of more associated C&C 110 may act to control/infect the victim computers 108.

Furthermore, the attacker group 100 may further comprise a master computer 104 (sometimes called a botmaster) that is coupled to each C& Cs 106, 110 and the master computer 104 controls each of the C& Cs 106, 110. The system and method described below may be used to discover each of the C&Cs 106, 110 and the master computer 104 using various entity data sources as described below.

Figure 2:
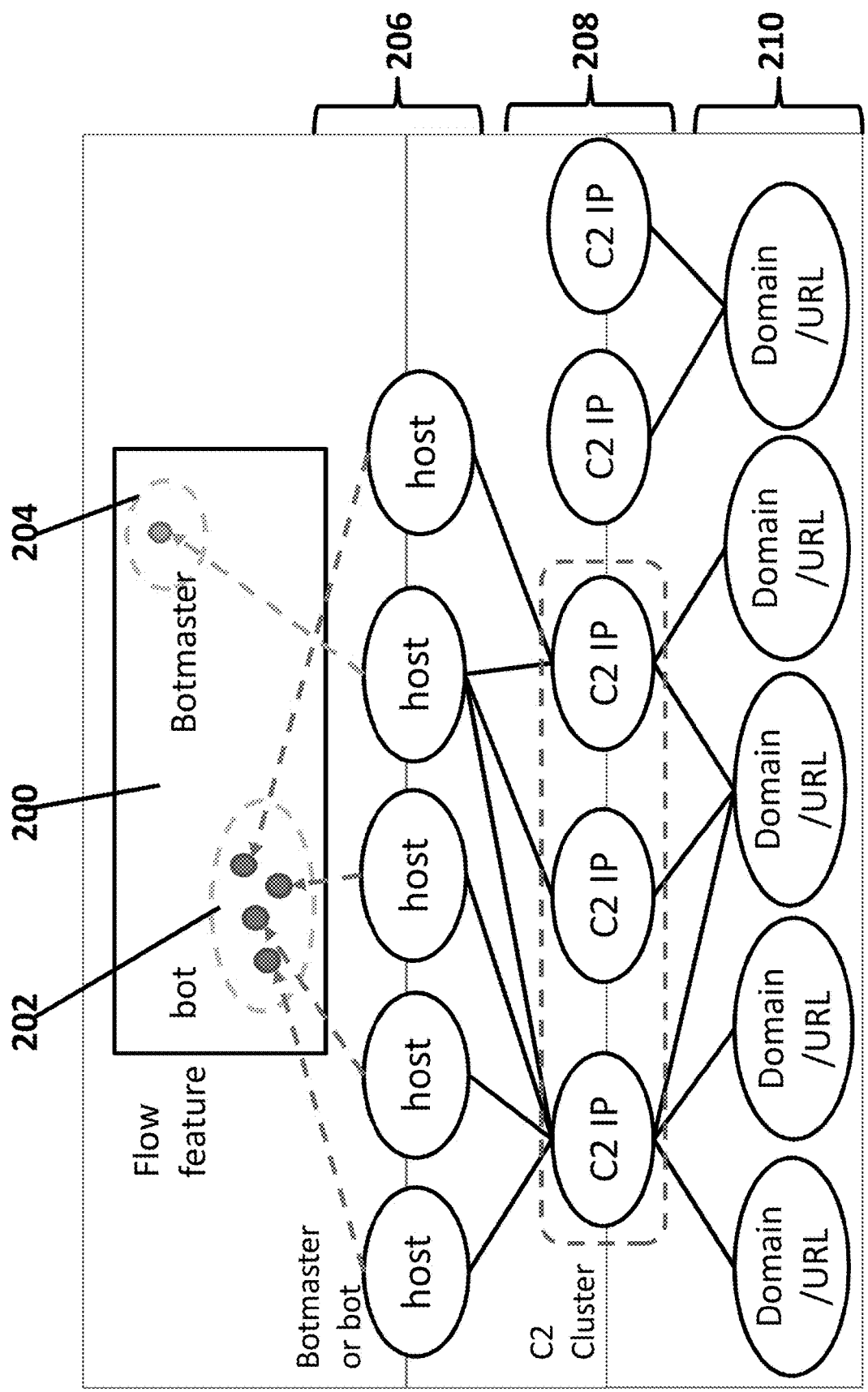
FIG. 2 illustrates a botmaster discovery process.

FIG. 2 illustrates a botmaster discovery process 200 that shows one or more bot computers 202 and a botmaster 204 from a network that may include one or more host computers 206, one or more command and control computers with IP addresses (C2 IP) 208 and one or more domains/uniform resource locators (URLs) 210. Each bot 202 may be a user who downloaded nefarious code but not a botmaster as suggested by the netflow data as described below. In contrast, the botmaster 204 may have a different behavior based on the netflow than the bots 202 and may be the botmaster.

As shown in FIG. 2, each of the hosts 206 may host the bot 202 or the botmaster 204. Each of the hosts 206 may be controlled by at least one of the command and control computers 208 wherein each command and control computer has its own IP address. Each of the command and control computers 208 may have one or more domains/URLs 210 as shown. Based on the above structure and relationships between the various computer systems, the system and method utilizes, in part, the netflow between the elements to identify the C&C and the botmaster 204. Using the system, as shown in FIG. 2, the system may discover the botmaster 204 and associated C2 IP 208 by IP/domain cluster using the netflow feature as described below. The system may also extract communication pattern of C2 clusters and botmaster candidates through netflow as described below in more detail. The system may also cluster malicious proxy IP/URLs (domain/IP-flux) through blacklist data and passive DNS data.

In the system and method, the goal of the system and method is to discover the attacker group and the botmaster. The data input to the system may be Blacklist data, passive DNS data and netflow data. The system and method may cluster domain-IP clusters, extract C2 cluster patterns and host connected to every clusters and extract the botmaster.

Figure 3:
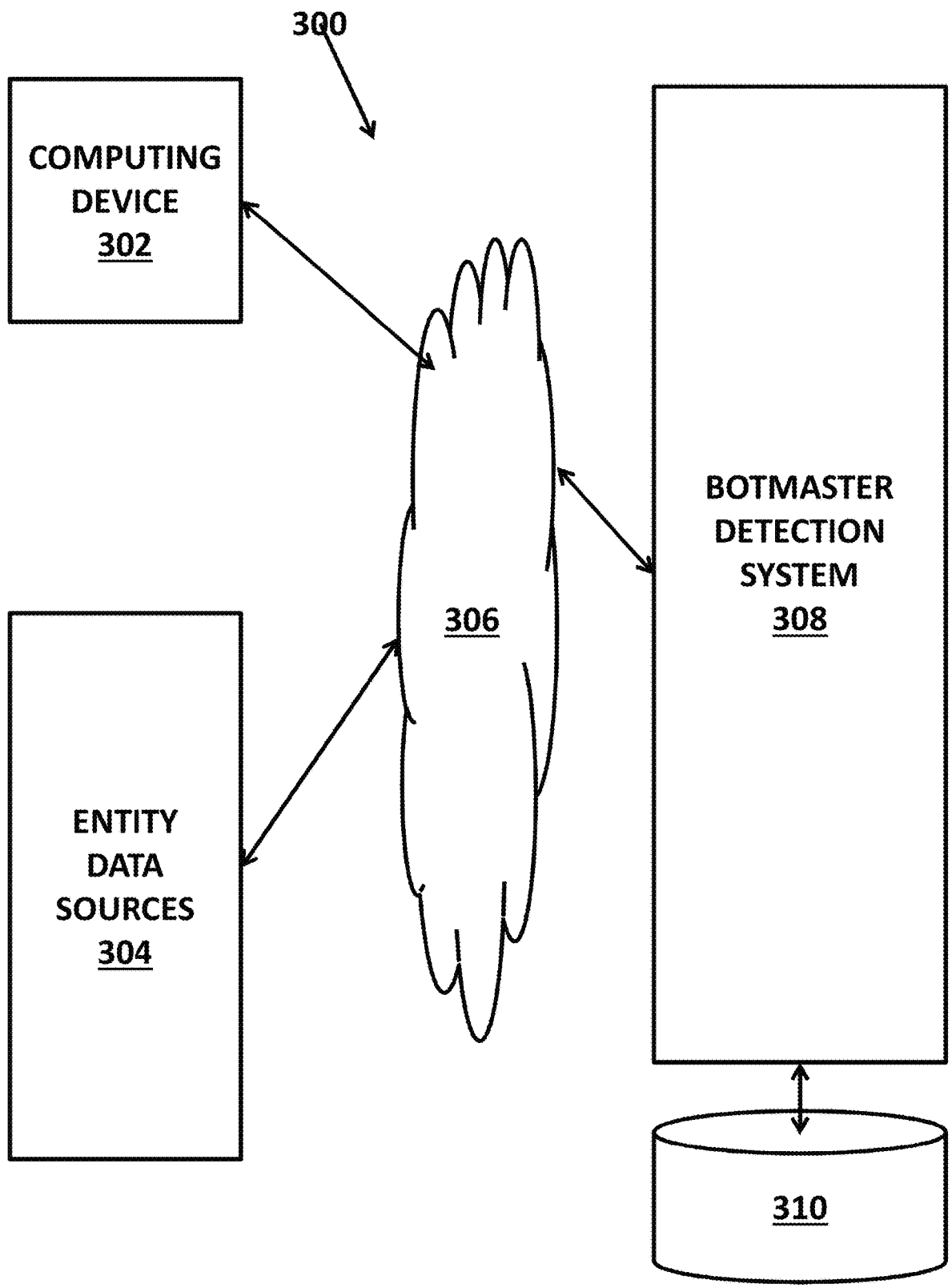
FIG. 3 illustrates an implementation of a botmaster discovery system and apparatus.

FIG. 3 illustrates an implementation of a botmaster discovery system and apparatus 300. In this implementation, a botmaster detection component 308 may be software as a service in which a user may use one or more computer devices 302 to couple to and exchange data with the botmaster detection component 308 over a communication path 306. Alternatively, the botmaster detection component 308 may be embedded into a network security system or part of a network security system or may be implemented on a standalone computer system. The botmaster detection component 308 may perform a botmaster discovery process using data already stored in a store 310 of the system, data submitted by the user using the computing device 302 or data stored remotely from the botmaster detection component 308 and may return botmaster discovery results data based on the user. In some embodiments, the botmaster detection component 308 may receive data from one or more entity data sources 304 over the communication path 306.

Each computing device 302 may be a processor based device with memory, such as SRAM or DRAM, persistent storage, such as flash memory or a hard disk drive, a display and communication circuits (wired or wireless) that allow the computing device to couple to the botmaster discovery component 308 and exchange data with the botmaster discovery component 308. For example, each computing device 308 may be a smartphone device, such as an Apple iPhone or Android OS based device, a cellular phone, a personal computer, a laptop computer, a tablet computer, a terminal device and the like. In some embodiments, the computing device may have a mobile application or browser application that may facilitate communications with the botmaster discovery component 308.

The communication path 306 may be a wired communication path, a wireless communication path or a combination of a wired and wireless communications paths. For example, the communication path 306 may be the Internet, Ethernet, a digital data network, a cellular digital data network, a WiFi network, a LAN, a WAN and the like. The communication path 306 may use known or yet to be developed protocols to facilitate the exchange of data between the botmaster discovery component 308, each computing device 302 and the entity data sources 304. For example, the communication path may use the known TCP/IP and HTTP/HTTPS protocols when the computing device 302 uses the browser application to exchange data using webpages in HTML format.

The one or more entity data sources 304 may be local to the botmaster discovery component 308 or remote from the botmaster discovery component 308 or a combination thereof. Generally, the one or more entity data sources 304 may store data about a particular computer network, such as its IP addresses, netflow data, domain names, etc. (collectively "botmaster discovery data") and the botmaster discovery component 308 may utilize that data to perform the botmaster discovery process as described below.

The botmaster discovery component 308 may be implemented in hardware or software. When the botmaster discovery component 308 is implemented in software, the botmaster discovery component 308 may be a plurality of lines of computer code/instructions that may be executed by a one or more processors of a computing resource on which the botmaster discovery component 308 is hosted, such as a server computer, a blade server and the like, so that the processor(s) are configured to perform the operations of the botmaster discovery component 308 as described below. When the botmaster discovery component 308 is implemented in hardware, the botmaster discovery component 308 may a hardware device such as an integrated circuit, a gate array, a microcontroller, a microprocessor, etc. that is operated to perform the operations of the botmaster discovery component 308 as described below.

The store 310 may store various data of the botmaster discovery component 308 such as the computer code or instructions when the botmaster discovery component 308 is implemented in software, some or all of the entity data for the botmaster discovery process, other data about the attacker group being analyzed, user data and the like.

Figure 4:
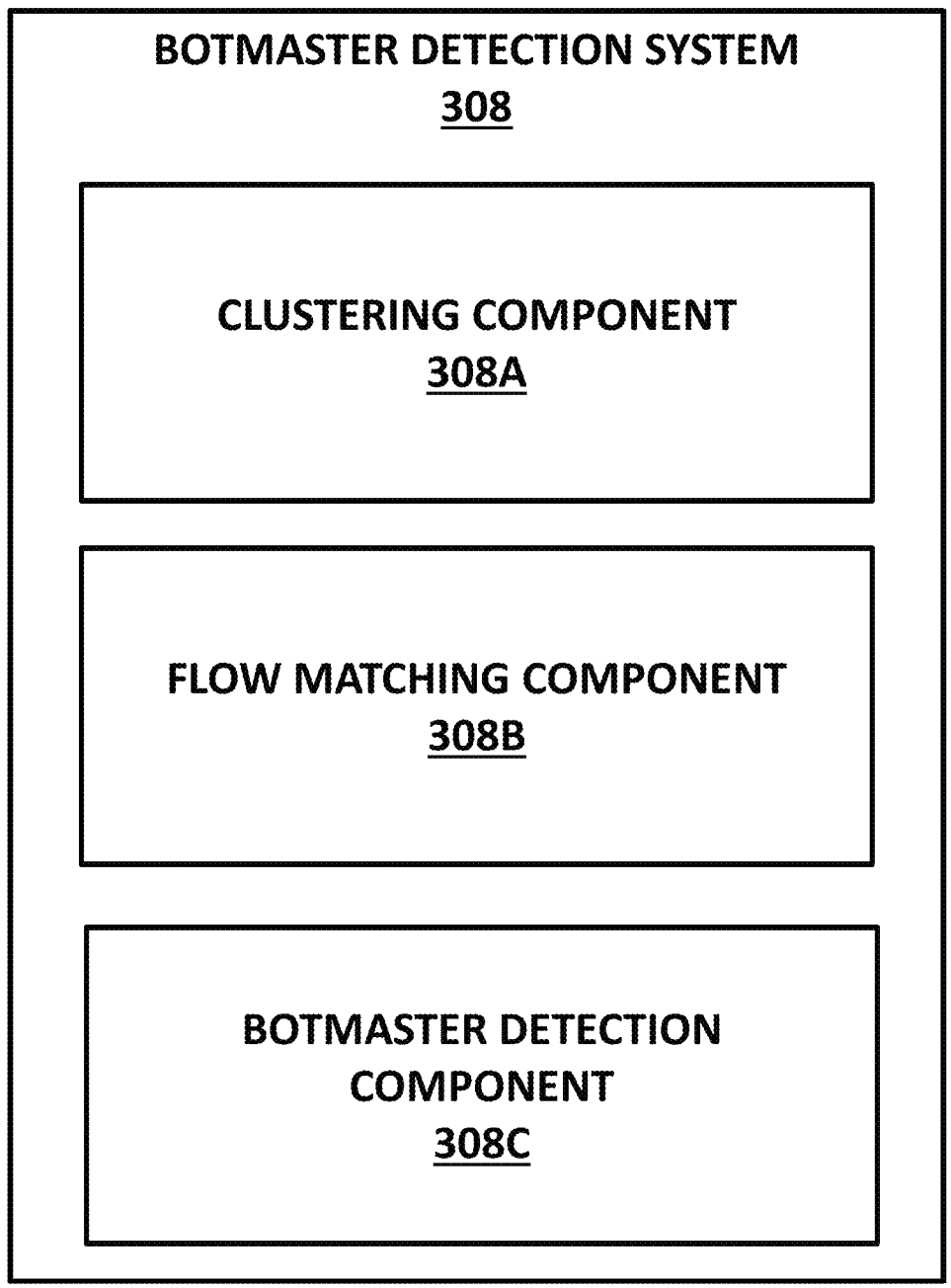
FIG. 4 illustrates more details of the botmaster discovery component of the botmaster discovery system and apparatus.

FIG. 4 illustrates more details of the botmaster discovery component 308 of the botmaster discovery system and apparatus. The sub-components of the botmaster discovery component 308, as above, may be implemented in hardware or software as described above. The botmaster discovery component 308 may have a clustering component 308A that may cluster domain-IP clusters as described below, a flow matching component 308B that may extract C2 cluster patterns and host connected to every clusters using netflow data as described below and a botmaster detection component 308C that discovers and extracts the botmaster based on the clustering and the flow matching analysis as described below.

Figure 5:
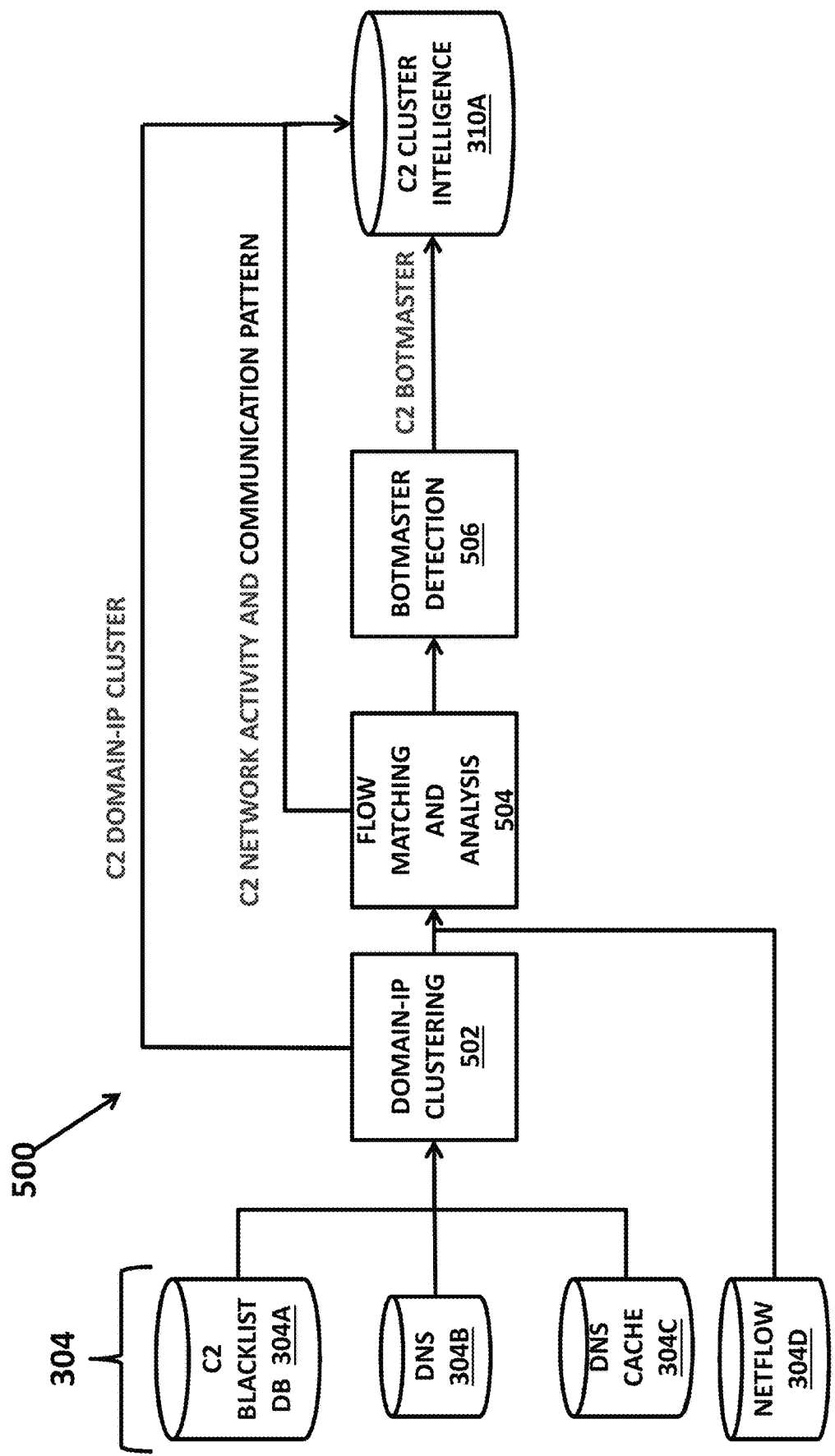
FIG. 5 illustrates another implementation of the botmaster discovery process.

FIG. 5 illustrates another implementation of the botmaster discovery process 500. The process 500 may be implemented using the system in FIGS. 3-4, but may also be implemented using other systems and devices that can perform the processes described below. In this implementation of the method, the entity data sources 304 may more specifically include C2 blacklist data 304A (an example of which is shown in FIG. 6B), domain name service (DNS) data 304B (an example of which is shown in FIG. 6B), DNS cache data 304C (an example of which is shown in FIG. 6B) and netflow data 304D (an example of which is shown in FIG. 6B).

The method may perform a domain-IP clustering process 502 that generates one or more C2 domain-IP clusters that may be stored in a C2 cluster intelligence data store 310A (that may be stored in store 310 in FIG. 3 for example). The domain-IP clustering process 502 may be performed based on the blacklist data 304A, DNS data 304B and DNS cache data 304C (passive DNS data). The blacklist data may include known malicious systems and may include at least one domain and an IP address for the known malicious systems.

The one or more C2 domain-IP clusters may each include the following exemplary data:
  Cluster size (number of IP addresses per domain)
  One or more cluster members (with each cluster member being identified by IP, Domain)
  Cluster type (IP-flux, domain-flux, hybrid) wherein domain flux means a cluster with a lot of domains for a small number of IP addresses, IP-flux means a cluster with a lot of IP addresses for a small number of domains and hybrid is a mix of the above
  Core C2 member (identified by IP address and domain)

Figure 6A:
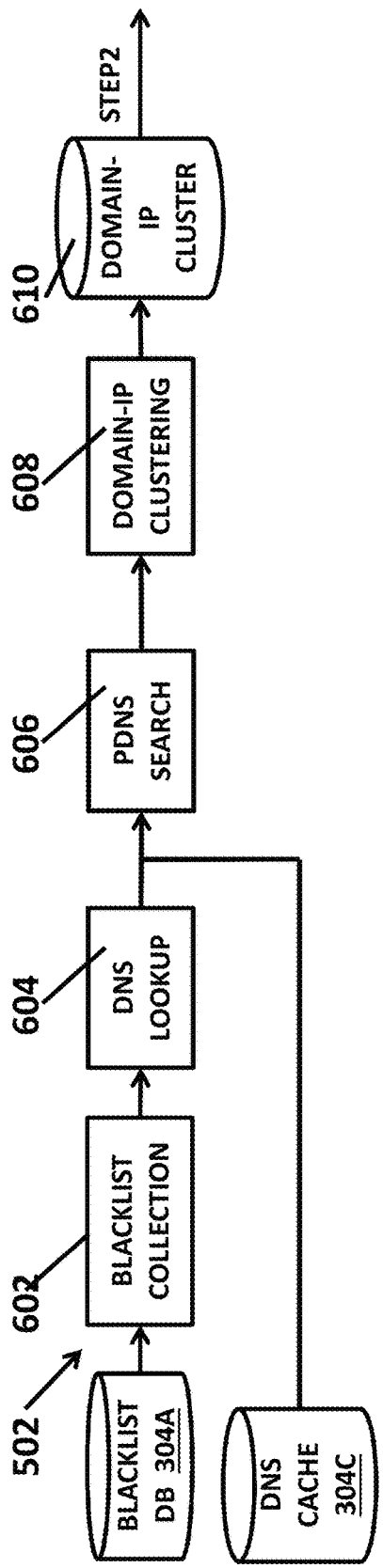
FIGS. 6A and 6B illustrate more details of a domain-IP clustering process that is part of the botmaster discovery process.
Figure 6B:
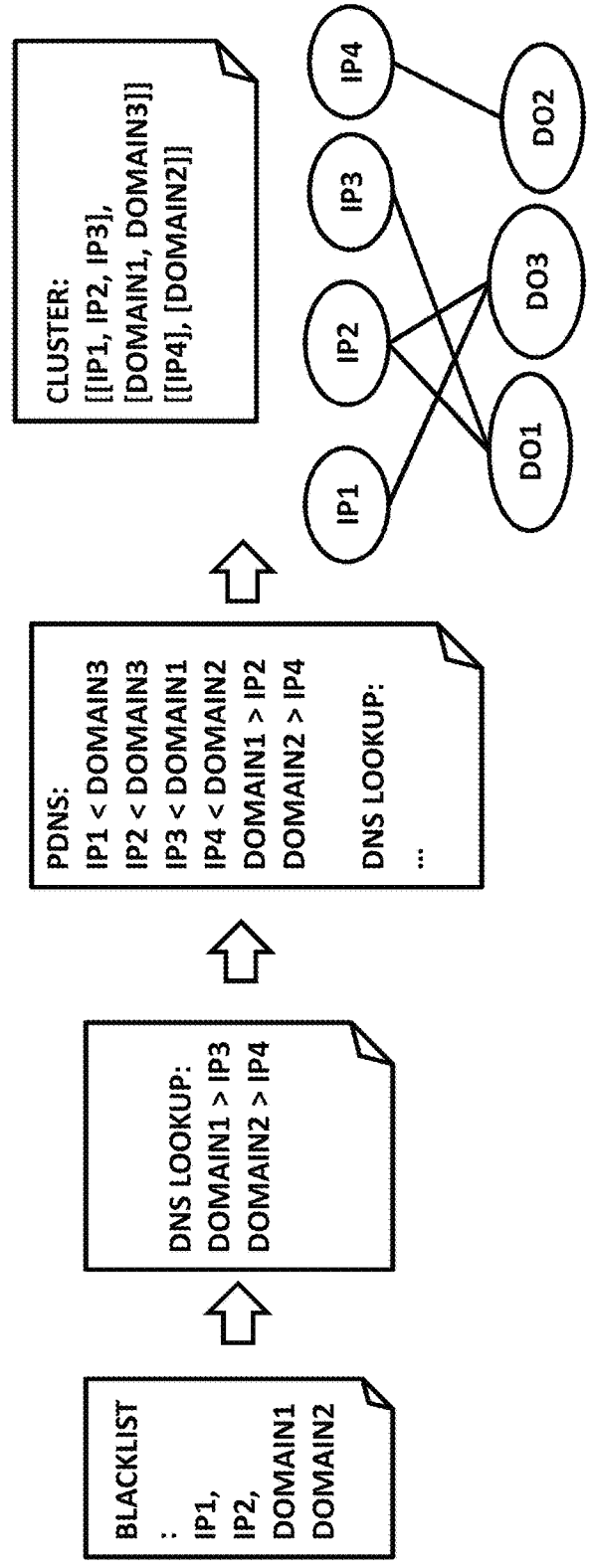

Further details of the domain-IP clustering process 502 are shown in FIGS. 6A-6B described below. In one embodiment, this process 502 may be performed by the clustering component 308A in FIG. 4.

Returning to FIG. 5, the method may also perform a flow matching and analysis process 504 that generates one or more C2 network activity and communication patterns that may be stored in the C2 cluster intelligence data store 310A (that may be stored in store 310 in FIG. 3 for example). The flow matching and analysis process 504 may be performed based on the C2 domain-IP cluster data and the netflow data 304D.

The one or more C2 network activity and communication patterns may each include the following exemplary data:
  Cluster activity: time series based on number of infected hosts;
  Cluster communication pattern: star, multi-server, hierarchical or hybrid wherein each of these patterns is the same as the network communications patterns that have the same name.

Further details of the flow matching and analysis process 504 are shown in FIGS. 7A-7B described below. In one embodiment, this process 504 may be performed by the flow matching component 308B in FIG. 4.

Returning to FIG. 5, the method also may perform a botmaster detection process 506 that generates one or more C2 botmaster pieces of data that may be stored in a C2 cluster intelligence data store 310A (that may be stored in store 310 in FIG. 3 for example). The botmaster detection process 506 is an optional process and may or may not be performed during the implementation of the method in certain embodiments. The botmaster detection process 506 may be performed based on the C2 domain-IP cluster data and the C2 network activity and communication patterns. Each botmaster pieces of data may be a cluster botmaster IP defined as a deeper involved host based on the netflow data.

Figure 8A:
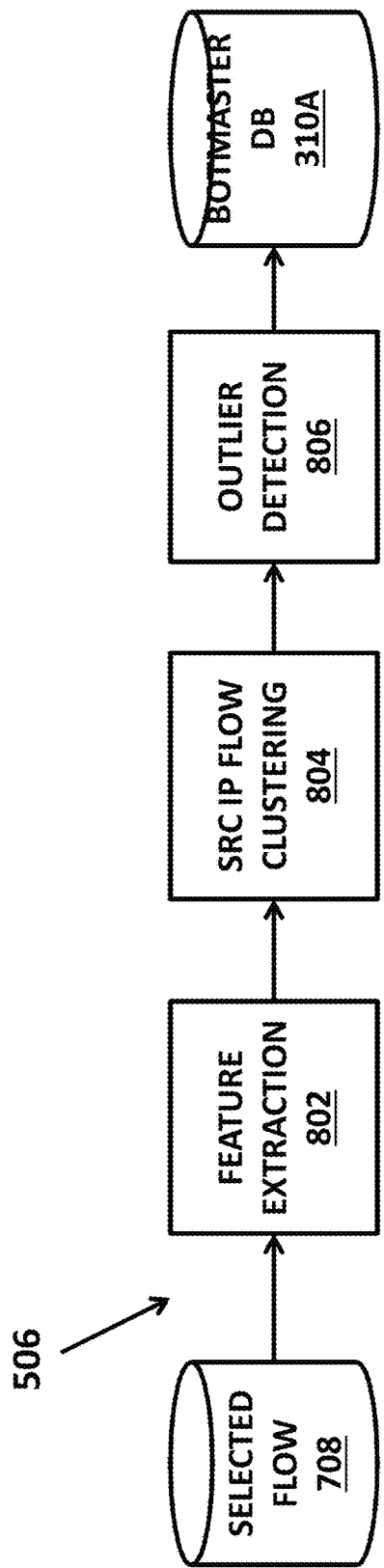
FIGS. 8A and 8B illustrate more details of a botmaster detection process that is part of the botmaster discovery process.
Figure 8B:
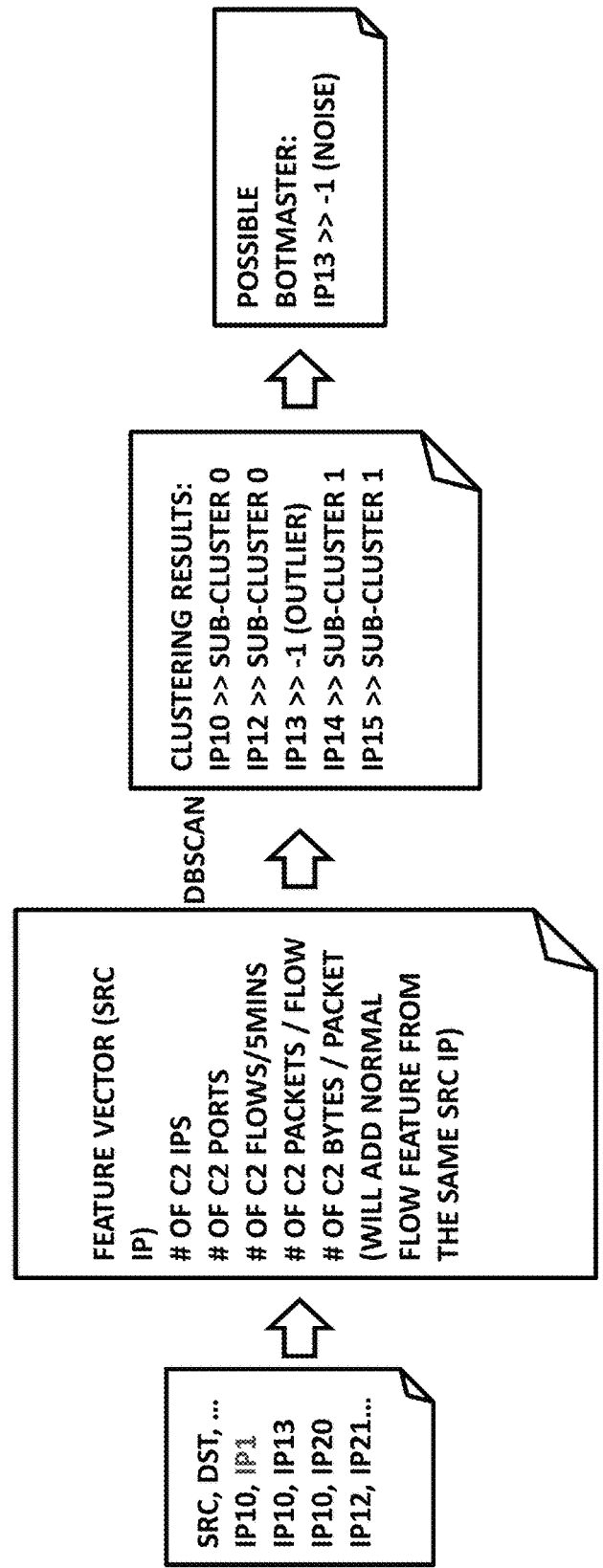

Further details of the botmaster detection process 506 are shown in FIGS. 8A-8B described below. In one embodiment, this process 506 may be performed by the botmaster detection component 308C in FIG. 4.

FIGS. 6A and 6B illustrate more details of a domain-IP clustering process 502 that is part of the botmaster discovery process. For purposes of the simplicity of the disclosure, a very small set of data is used to illustrate the processes of this method. However, it should be understood that the method may be performed using very large amounts of data as well and that would be within the scope of the disclosure. In the process, a blacklist collection is obtained (602), an example of which is shown in FIG. 6B. The blacklist collection, as shown in FIG. 6B is a list of known malicious systems and sites and the blacklist collection contains IP addresses (IP1, IP2 in the example in FIG. 6B) for each of the malicious systems and domains (Domain1, Domain2 in the example in FIG. 6B).

In some embodiments, the size of the blacklist collection may be unlimited. In some embodiments, the size of the blacklist collection may be limited to a maximum size of the IP addresses, a maximum size of domains or a maximum size of a sum of domains and IP addresses. Alternatively, the blacklist collection may be limited based on a calculation time limitation so that, once the system and method reaches the limitation, it can stop clustering and store the result already calculated.

The method may perform a DNS lookup (604) based on the blacklist collection in which certain IP addresses may be matched to certain domains since the DNS has a plurality of IP address and domain associated with the IP address pairs. As shown in FIG. 6B, the DNS lookup may result in Domain1 being linked to IP3 and Domain2 being linked to IP4.

The method may then perform a passive DNS (PDNS) search (606) using the data from the blacklist and the DNS lookup. As shown in FIG. 6B, the result of the passive DNS search based on the exemplary data may be various associations between IP addresses and domain names (such as IP1<Domain3, IP2<Domain3, . . . , Domain2>IP4 as shown in FIG. 6B). The method may then perform domain-IP clustering 608 that generates domain-IP cluster data 610. As shown in FIG. 6B, the domain-IP cluster data may be one or more clusters of domain/IP pairs. For example, based on the exemplary data in FIG. 6B, the clusters may be [[IP1, IP2, IP3], [Domain1, Domain3]] and [[IP4], Domain2]] which are also shown graphically in FIG. 6B based on the passive DNS results data.

FIGS. 7A and 7B illustrate more details of a flow matching and analysis process 504 that is part of the botmaster discovery process. For purposes of the simplicity of the disclosure, a very small set of data is used to illustrate the processes of this method. However, it should be understood that the method may be performed using very large amounts of data as well and that would be within the scope of the disclosure. In the process, a flow matching process by destination IP (702) may be performed using the raw netflow data 304D and the domain-IP cluster data 610. As shown in FIG. 7B, the IP cluster data generated by the process shown in FIG. 6A may be combined with netflow data (IP10, IP1, IP11, IP5, etc. . . . ) to generate the flow matching by destination address as shown in FIG. 7B. The flow matching may compute flow features of the matched flows. The resulting flow matching by destination address may be input to a source IP flow selection process (704) and a flow attribute analysis process (706). An example of the results of these processes are shown in FIG. 7B. The result of the source IP flow selection process (704) is a selected flow 708 while the flow analysis attribute process (706) result is a cluster attribute (710), an example of which is shown in FIG. 7B.

Figure 9:
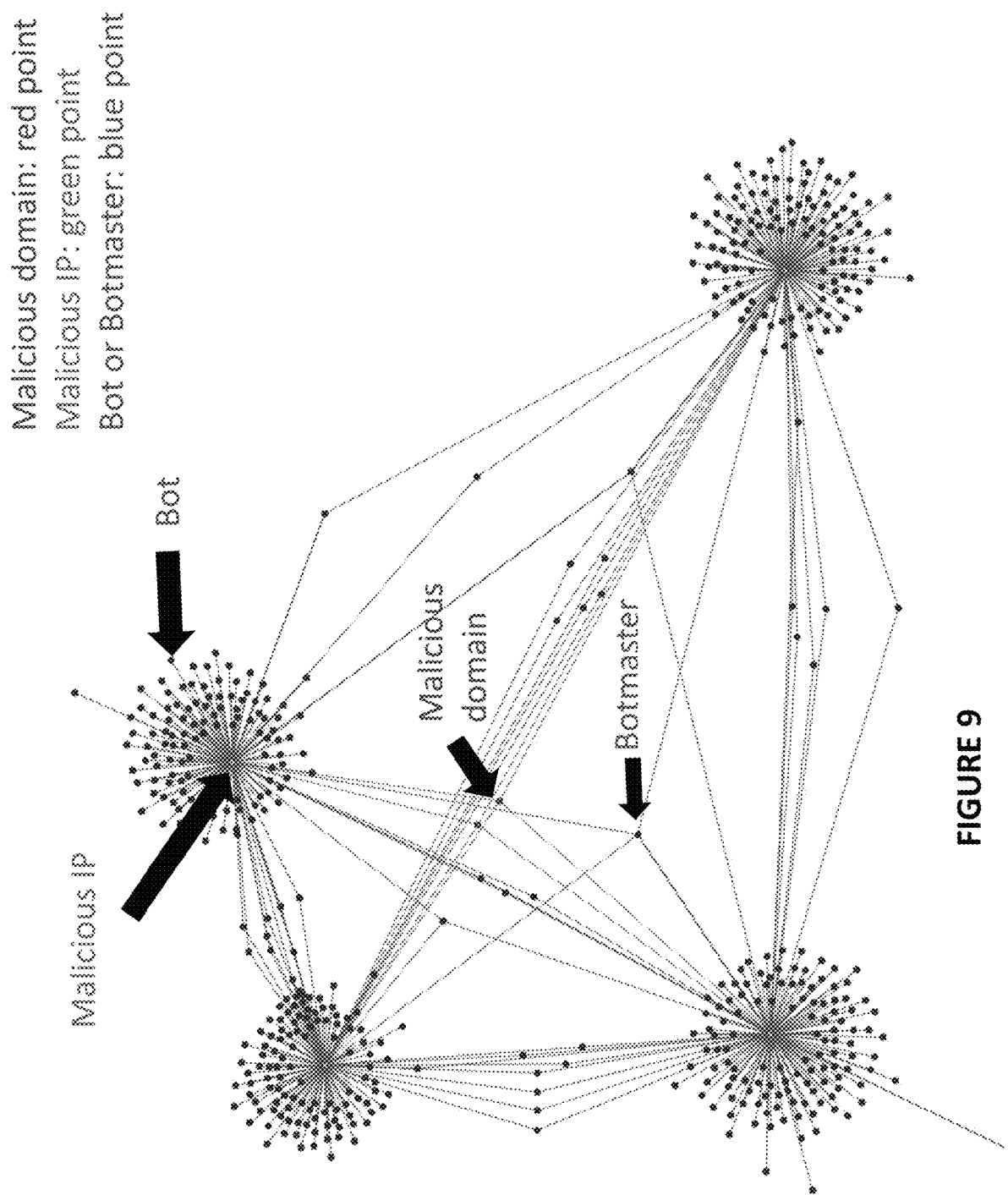
FIG. 9 illustrates POC user interface showing a detected botmaster.

FIGS. 8A and 8B illustrate more details of a botmaster detection process 506 that is part of the botmaster discovery process. For purposes of the simplicity of the disclosure, a very small set of data is used to illustrate the processes of this method. However, it should be understood that the method may be performed using very large amounts of data as well and that would be within the scope of the disclosure. In the method, the selected flow 708 may be input into a feature extraction process (802) that extracts one of features from the flow such as shown in the example in FIG. 8B. The method may then perform source IP flow clustering (804) an example of which is shown in FIG. 8B as the clustering results. As an example, IP10, IP12, IP13, IP14 and IP15 are the hosts connected to the same malicious Domain-IP cluster. Note in the example clustering results that IP10 and IP 12 are in sub-cluster 0 which represent a group having similar flow features, while IP14 and IP 15 are in sub-cluster 1, but IP13 is not in any sub-cluster and is an outlier. Thus, the clustering results may be input into a outlier detection process 806 that detects the IP addresses that do not cluster with the other IP addresses (known as outliers). In the example shown in FIG. 8B, IP13 is an outlier and thus identified as a botmaster and stored in a botmaster database 310A. FIG. 9 illustrates POC user interface showing a detected botmaster.

In FIGS. 8A and 8B, the flow features may be an average and standard division on each of flow number per hour, a packet number per flow, a byte number per packet, and a distinct number of malicious IP address a host connected to during a desired time period.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The system and method described above improves another technical field of cyber threat protection and detection. More specifically, the system and method is able to discover/identify a botmaster of an attack group that was not previously done with typical cyber threat protection and detection systems and methods. In more detail, the system and method uses blacklist data, domain name service (DNS) data, passive DNS data and cache data and netflow data and analyzes that data to discover/identify a botmaster of an attack group. Furthermore, the system and method generate a plurality of clusters of known malicious entities, the known malicious entities being one or more known malicious IP addresses, one or more known malicious domains and a known malicious domain and a known malicious IP address and perform flow matching of each IP address in each cluster of known malicious entities between a plurality of source IP addresses and a plurality of destination IP addresses to identify a plurality of host flows wherein each host flow has a source IP address or a destination IP address matched a particular IP address in a cluster of known malicious entities. The system and method may also detect a bot master of each cluster of known malicious entities from the plurality of host flows corresponding to each cluster of known malicious entities by analyzing difference of flow features between bot and botmaster. Thus the claimed system and method improve another field of technology.

The system and method also solves a problem that did not exist before the Internet and computer networks. Specifically, cyber threats did not exist prior to the Internet and computer networks and the system and method is thus not just implementing an old idea on a computer. Thus, the claimed solution is not a solution to an old problem and is not simply a computer implementation of a known manual solution.

Furthermore, the system and method are implemented on a machine (the processor), but the machine does not just perform generic computer functions. More specifically, the machine performs the claims process of generating a plurality of clusters of known malicious entities, the known malicious entities being one or more known malicious IP addresses, one or more known malicious domains and a known malicious domain and a known malicious IP address that is not merely a generic computer function. Similarly, the machine performs flow matching of each IP address in each cluster of known malicious entities between a plurality of source IP addresses and a plurality of destination IP addresses to identify a plurality of host flows wherein each host flow has a source IP address or a destination IP address matched a particular IP address in a cluster of known malicious entities that is also not a generic computer function. In addition, the machine performs detecting a bot master of each cluster of known malicious entities from the plurality of host flows corresponding to each cluster of known malicious entities by analyzing difference of flow features between bot and botmaster that is also not a generic computer function.

The system and method also adds meaningful elements that are more than just generally linking the abstract idea to a technology environment. More specifically, the system and method recite generating a plurality of clusters of known malicious entities, the known malicious entities being one or more known malicious IP addresses, one or more known malicious domains and a known malicious domain and a known malicious IP address that is more than just generally linking the abstract idea to a technology environment. Furthermore, the claims recite performing flow matching of each IP address in each cluster of known malicious entities between a plurality of source IP addresses and a plurality of destination IP addresses to identify a plurality of host flows wherein each host flow has a source IP address or a destination IP address matched a particular IP address in a cluster of known malicious entities that is more than just generally linking the abstract idea to a technology environment. Furthermore, the claims recite detecting a bot master of each cluster of known malicious entities from the plurality of host flows corresponding to each cluster of known malicious entities by analyzing difference of flow features between bot and botmaster that is more than just generally linking the abstract idea to a technology environment.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. An apparatus, comprising:
a processor;
a memory;
one or more storage units connected to the processor, the one or more storage units storing a blacklist having a plurality of known malicious internet protocol (IP) addresses and a plurality of known malicious domains, a domain name service data set that maps a particular domain to a particular IP address and a netflow data set that contains a source/destination IP address connected to a destination/source IP address through which digital data is communicated;
the processor executing a plurality of lines of computer code and the execution of the lines of computer code cause the processor to be configured to perform the following processes on a network having a plurality of known malicious domains, a plurality of servers each having a known malicious internet protocol (IP) address in which each server is associated with one or more of the plurality of domains, a plurality of hosts associated with one or more of the plurality of servers wherein the host is one of a bot which is compromised host and involved as a part of resource for cyber-crime purpose and a botmaster which involves bats for cyber-crime purpose, the processes further comprising:
generating, using a blacklist and DNS data, a plurality of clusters of known malicious entities, the known malicious entities being one or more known malicious IP addresses, one or more known malicious domains and a known malicious domain and a known malicious IP address;

performing flow matching of each IP address in each cluster of known malicious entities between a plurality of source IP addresses and a plurality of destination IP addresses to identify a plurality of host flows wherein each host flow has a source IF address or a destination IP address matched a particular IP address in a cluster of known malicious entities; and detecting a bat master of each cluster of known malicious entities from the plurality of host flows corresponding to each cluster of known malicious entities by analyzing clusters of host IP addresses connected to each cluster of known malicious entities with flow based statistical features and detecting an IP address of an entity that does not cluster with the IP addresses of the other entities in the cluster of the hosts.

2. The apparatus of claim 1, wherein the processor is configured to generate a plurality of clusters of known malicious entities further comprises the processor being configured to cluster, using a blacklist having a plurality of known malicious internet protocol (IP) addresses and a plurality of known malicious domains and a domain name service data set that maps a particular domain to a particular IP address, the plurality of clusters of known malicious entities.

3. The apparatus of claim 1, wherein the processor is configured to compute flow features, to cluster hosts which are bots having similar flow features and to detect minority hosts which have different flow features from other similar bots.

4. The apparatus of claim 3, wherein the processor being configured to compute flow features further comprises the processor being configured to determine one of an average and standard division on each of flow number per hour, a packet number per flow, a byte number per packet, and a distinct number of malicious IP address a host connected to during a desired time period.

5. A method, comprising:
one or more storage units connected to the processor, the one or more storage units storing a blacklist having a plurality of known malicious internet protocol (IP) addresses and a plurality of known malicious domains, a domain name service data set that maps a particular domain to a particular IP address and a netflow data set that contains a source/destination IP address connected to a destination/source IP address through which digital data is communicated;

providing a network having a plurality of known malicious domains, a plurality of servers each having a known malicious internet protocol (IP) address in which each server is associated with one or more of the plurality of domains, a plurality of hosts associated with one or more of the plurality of servers wherein the host is one of a bot which is compromised host and involved as a part of resource for cyber-crime purpose and a botmaster which involves bats for cybercrime purpose;

generating, using a blacklist and DNS data, a plurality of clusters of known malicious entities, the known malicious entities being one or more known malicious IP addresses, one or more known malicious domains and a known malicious domain and a known malicious IP address;

performing flow matching of each IP address in each cluster of known malicious entities between a plurality of source IP addresses and a plurality of destination IP addresses to identify a plurality of host flows wherein each host flow has a source IP address or a destination IP address matched a particular IP address in a cluster of known malicious entities; and detecting a botmaster of each cluster of known malicious entities from the plurality of host flows corresponding to each cluster of known malicious entities, by analyzing clusters of host IP addresses connected to each cluster of known malicious entities with flow based statistical features and detecting an IP address of an entity that does not cluster with the IP addresses of the other entities in the cluster of the hosts.

6. The method of claim 5, wherein generating the plurality of clusters further comprises clustering, using a blacklist having a plurality of known malicious internet protocol (IP) addresses and a plurality of known malicious domains and a domain name service data set that maps a particular domain to a particular IP address, the plurality of clusters of known malicious entities.

7. The method of claim 5 further comprising computing flow features, to cluster hosts which are bots having similar flow features and to detect minority hosts which have different flow features from other similar bots.

8. The method of claim 7, wherein computing the flow features further comprises determining one of an average and standard division on each of flow number per hour, a packet number per flow, a byte number per packet, and a distinct number of malicious IP address a host connected to during a desired time period.

* * * * *